US010397273B1

(12) United States Patent
Stickle et al.

(10) Patent No.: US 10,397,273 B1
(45) Date of Patent: Aug. 27, 2019

(54) THREAT INTELLIGENCE SYSTEM

(71) Applicant: Amazon Technologies, Inc., Seattle, WA (US)

(72) Inventors: Thomas Charles Stickle, Saint James, NY (US); Shane Anil Pereira, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 32 days.

(21) Appl. No.: 15/668,627

(22) Filed: Aug. 3, 2017

(51) Int. Cl.
*H04L 29/06* (2006.01)

(52) U.S. Cl.
CPC .................. *H04L 63/1491* (2013.01)

(58) Field of Classification Search
CPC .................................................... H04L 63/1491
See application file for complete search history.

(56) References Cited

U.S. PATENT DOCUMENTS

| 9,124,636 | B1 | 9/2015 | Rathor | |
|---|---|---|---|---|
| 2016/0359915 | A1* | 12/2016 | Gupta | ..................... H04L 43/04 |
| 2017/0142144 | A1 | 5/2017 | Weinberger et al. | |
| 2017/0163666 | A1* | 6/2017 | Venkatramani | ..... H04L 63/0272 |
| 2017/0171235 | A1 | 6/2017 | Mulchandani et al. | |
| 2017/0272469 | A1 | 9/2017 | Kraemer et al. | |
| 2018/0113952 | A1 | 4/2018 | Brown | |
| 2018/0191771 | A1 | 7/2018 | Newman et al. | |

* cited by examiner

*Primary Examiner* — Hee K Song
(74) *Attorney, Agent, or Firm* — Quarles and Brady LLP

(57) ABSTRACT

Systems are provided for collecting threat intelligence to use in monitoring network activity in computing environments for malicious activity. The systems load sensors into compute resources associated with particular users of a compute resource virtualization platform. The systems receive network activity information sent by first and second sensors, identify an IP address as being a suspected source of malicious computing activity using aggregated the first and second network activity, and generate threat information that includes the IP address as a suspected source of malicious computing activity.

18 Claims, 8 Drawing Sheets

THREAT INTELLIGENCE SYSTEM

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf of, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources and software applications to enable a computing device to provide different desired functionalities, or to provide similar functionalities more efficiently. Further, virtual machines may themselves be partitioned into multiple isolated virtual systems, sometimes referred to as "containers." The virtual machine controls allocation of resources such as processing power and memory, and each container has its own process and network space in which the container may, for example, execute software programs.

In such a system, a service provider may provide virtual machine resources to many different users, and may operate disparate physical computing devices that communicate with each other and with external resources over any number of networks and sub-networks of varying types. Such systems may require monitoring of network traffic for potentially malicious communications.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
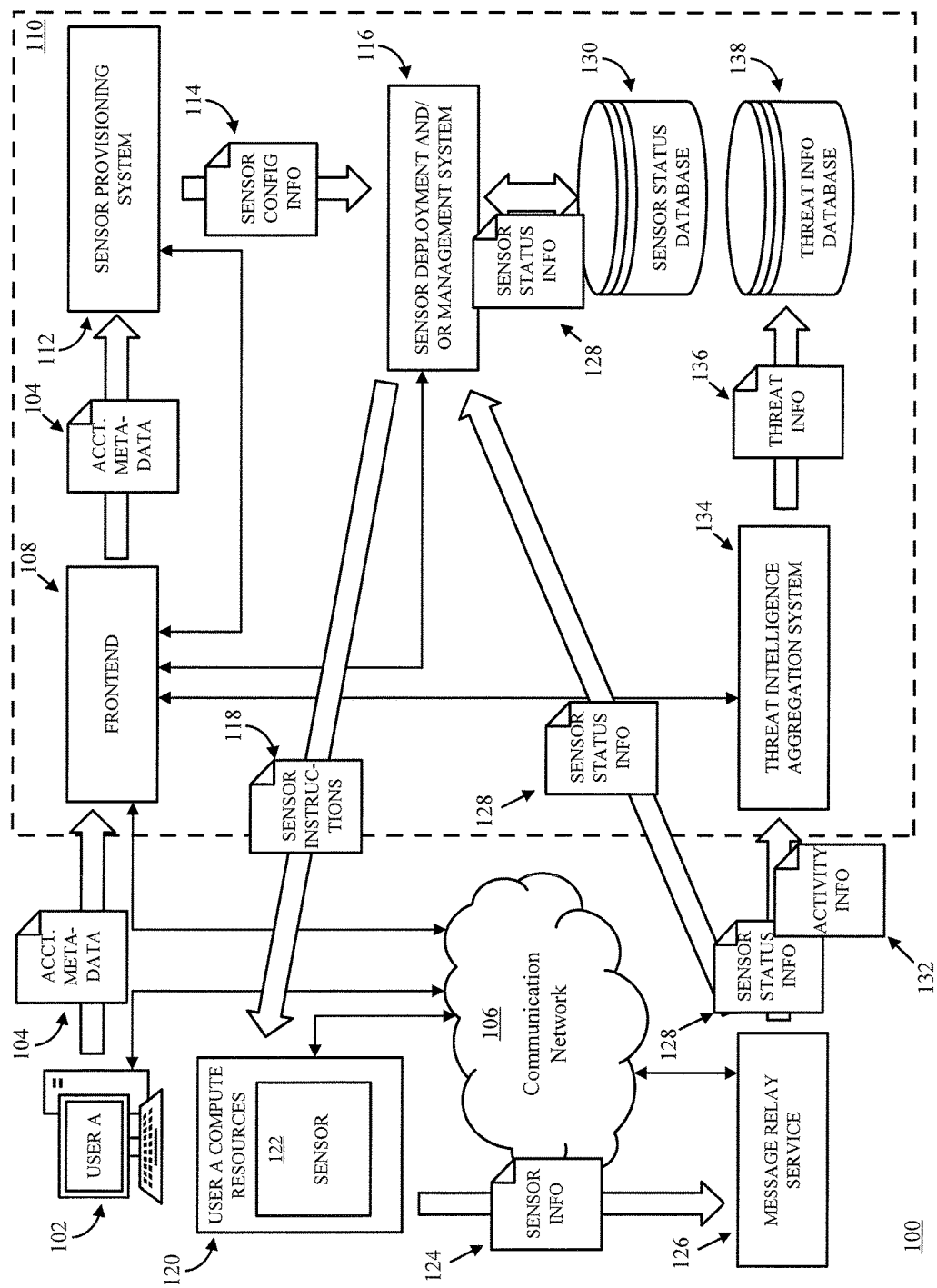
FIGS. 1A and 1B are diagrams of example systems for collecting threat intelligence in accordance with some embodiments of the disclosed subject matter.

A service provider can supply computing resources to developers and/or other users that can use the computing resources to provide computing environments, such as a virtual network, that can be used to perform computing operations (e.g., execute tasks for providing applications, services, database access, etc.). Such a service provider may wish to gather information that can be used to mitigate potential threats to the users' computing environments. While the service provider may be able to deploy only limited sensors for gathering such information using computing resources that are under the direct control of the provider, the service provider typically maintains a large number of physical computing devices that are used to provide compute resources to its users. These users often operate in diverse industries, and across a wide variety of locations. Accordingly, it would be advantageous if the service provider could utilize its users' compute resources to deploy sensors that can gather information, as this could dramatically increase the amount of information that the service provider can gather and use to benefit all of its users. However, in order to deploy sensors across users' compute resources, the service provider may give users an incentive to allow the provider use of their compute resources and/or receive the ability to create resources within the user's account.

The present disclosure describes implementable concepts and specific examples of a system for collecting threat intelligence that can be provided by the computing environment service provider, and deployed across the computing resources of many users to collect network activity information from sensors associated with many users' computing resources within the computing environment. As described below, the system for collecting threat intelligence can receive a request and permissions to deploy a sensor using a user's compute resources. For example, the user can be required to explicitly grant permission to the system for collecting threat intelligence to make changes to the configuration of the user's compute resources in order for the system to be permitted to deploy and monitor a sensor within a customer's virtual network.

In some embodiments, a deployed sensor can be isolated from user's other compute resources. For example, the system can deploy the sensor in one or more isolated subnets of a virtual network. In such an example, an isolated subnet can be associated with a security rule that blocks (and/or otherwise inhibits) communications between a computing device in the isolated subnet with one or more other subnets in the virtual network (e.g., subnets used in the production environment of the user). As another example, the system can create a parallel computing environment that appears to be similar to the user's computing environment, but is inhibited from interacting with the compute resources in the user's production computing environment. As yet another example, in some embodiments, a firewall (and/or other security rule) associated with sensor and/or a network interface of the sensor can be configured to block (and/or otherwise inhibit) communications from the sensor to one or more virtual machine instances associated with the user (e.g., virtual machine instances used in the production environment of the user).

In some embodiments, a sensor can be configured such that it appears to be similar to what a malicious user would expect in the user's actual systems. For example, if the user provides a website for accessing a database of information, a sensor can be configured to appear as a web server that can interact with another sensor configured to appear as a database server.

In some embodiments, deployed sensors can communicate collected network activity information to the system for collecting threat intelligence. For example, the sensors can send information to the system via a one-way communication technique that does not allow the sensor or the system executing the sensor to recover the information that is sent to the system.

In some embodiments, the system for collecting threat intelligence can gather information from sensors deployed across many user's compute resources, aggregate and anonymize the information, and determine which activity represents potentially malicious activity. The system can group the threat information by various categories, such as industry, geography, countries, etc. In some embodiments, the system can share the aggregated information with users that facilitated the deployment of the sensors, and/or can use the threat information to identify threats for other users. Such information can be tailored to a particular user's situation, such as by providing threat information specific to the user's industry, geographic area, language, country, operating system, etc.

FIG. 1A depicts an example of a system 100 for collecting threat intelligence in accordance with some embodiments of the disclosed subject matter. As shown in FIG. 1A, in some embodiments, system 100 can include a computing device 102 associated with a user (e.g., "user A") of a compute resource virtualization platform. In some such embodiments, the user can be a person (e.g., a developer, a website administrator, an application administrator, etc.) or an entity (e.g., a corporation, a non-profit organization, etc.). Additionally, in some embodiments, computing device 102 can act programmatically to perform one or more actions. Although shown as a single computing device, computing device 102 can be any suitable computing device or combination of devices. Additionally, in some embodiments, actions described herein as being performed by computing device 102 can be performed by one or more virtual machines that are provided by a compute service.

In some embodiments, computing device 102 can interact with a sensor provisioning and management system that is included as part of a computing environment 110 to deploy a sensor on compute resources associated with the user of computing device 102. In some embodiments, computing device 102 can interact with a frontend 108 to provide information about the user, and/or information about the configuration of the user's compute resources, to grant permissions to the sensor provisioning and management system to deploy and/or manage the sensor(s) on compute resources controlled by the user, etc.

In some embodiments, among other things, frontend 108 can provide a user interface (e.g., a webpage, an application, etc.) that can be presented to a user of computing device 102, and the user can manually select and/or provide information that can be used to configure and/or deploy one or more sensors on the user's compute resources. Additionally or alternatively, a user of computing device 102 can authorize the sensor provisioning and management system to gather information (e.g., the types of applications installed on the user's compute resources, how often the applications are used, how the user's compute resources are configured, etc.) that can be used to configure and/or deploy one or more sensors on the user's compute resources. In some embodiments, such information can be metadata 104 describing the user, and/or information about how the compute resources associated with the user are configured. For example, account metadata 104 can include information about the type(s) of business that the user is engaged in, such as financial services, pharmaceuticals, retail, logistics, etc. As another example, account metadata 104 can include information about where the user operates their business, such as one or more countries, one or more states, one or more metro areas, etc. As yet another example, in some embodiments, account metadata 104 can include information about where the user is permitting the one or more sensors to be deployed (e.g., one or more regions, one or more availability zones, one or more subnets of the user's virtual network, etc.).

In some embodiments, account metadata 104 can be sent from computing device 102 to frontend 108 via a communication network 106. In some embodiments, communication network 106 can be any suitable wired network, wireless network, any other suitable network, or any suitable combination thereof. Additionally, communication network 106 can be any suitable personal area network, local area network, wide area network, over-the-air broadcast network (e.g., for radio or television), cable network, satellite network, cellular telephone network, any other suitable type of network, or any suitable combination thereof. For example, communication network 106 can be a publicly accessible network of linked networks, in some cases operated by various distinct parties, such as the Internet. In some embodiments, communication network 106 can be a private or semi-private network, such as a corporate or university intranet. Additionally, in some embodiments, communication network 106 can include one or more wireless networks, such as a Global System for Mobile Communications ("GSM") network, a Code Division Multiple Access ("CDMA") network, a Long Term Evolution ("LTE") network, any other suitable wireless network, or any suitable combination of wireless networks. Communication network 106 can use any suitable protocols and/or components for communicating via the Internet and/or any of the other aforementioned types of networks. For example, communication network 106 can use one or more protocols or combinations or protocols, such as Hypertext Transfer Protocol ("HTTP"), HTTPS, Message Queue Telemetry Transport ("MQTT"), Constrained Application Protocol ("CoAP"), etc.

In some embodiments, frontend 108 can receive and process messages from computing device 102 and/or any other suitable computing device. For example, in some embodiments, frontend 108 can serve as a "front door" to other services provided by the sensor provisioning and management system, such as a sensor provisioning system 112 and/or a sensor deployment and/or management system 116 (hereinafter "sensor management system 116"). Frontend 108 can process messages received from computing device 102 and/or generated, for example, in response to events (e.g., when computing device 102 enters information into a user interface provided via frontend 108), and can determine whether the messages are properly authorized. For example, frontend 108 can determine whether user computing device 102 associated with the message is authorized to make requests to deploy sensors using the user's compute resources, and/or is authorized to grant permissions to, for example, sensor management system 116 to deploy sensors within the user's compute resources. In some embodiments, frontend 108 can include one or more application program interfaces ("APIs") that can receive messages from one or more computing devices 102 as API calls. As such, in an embodiment the frontend 108 can effectuate one or more APIs for interacting with the system, such as one or more APIs for authorizing the service provider to deploy a sensor, configuring the type of sensor(s) to deploy (e.g., database, web server, etc.), and configuring where the sensor can be deployed within the customer's virtual network or virtual networks.

In some embodiments, frontend 108 can provide account metadata 104 to sensor provisioning system 112, which can determine configuration information for the sensor that is to be deployed. For example, sensor provisioning system 112 can determine whether to deploy a single sensor or multiple sensors that can simulate a more complex computing environment. As another example, sensor provisioning system 112 can determine which other applications, if any are to be deployed with the sensor to make the sensor more convincing. As yet another example, sensor provisioning system 112 can generate and/or select decoy content that can make the sensor appear more convincing than a sensor with access to only very limited content. As still another example, sensor provisioning system 112 can determine where to deploy the sensor(s) (e.g., geographic region(s), availability zone(s), subnet, user's virtual network or a dummy virtual network, etc.). As a further example, sensor provisioning system 112 can determine what types of network interfaces and/or virtual network interfaces to associate with the sensor(s) and/or other application(s) to allow them to communicate (e.g., with frontend 108). Additionally, in some embodiments, sensor provisioning system 112 can determine how software (e.g., honeypot software) that monitors the sensor, logs monitored information, and/or sends status information of the sensor is to be configured. For example, the honeypot software can be configured to monitor operation of the sensor, monitor software executed by the sensor (e.g., software for implementing a web server, a mail server, a database management system, a load balancer, etc.), and/or monitors operation of a computing device (e.g., a virtual machine instance, a physical server) on which the sensor is implemented. As another example, the honeypot software can be configured to log particular information about the activity and/or processes associated with the sensor. In a more particular example, honeypot software to be deployed with a sensor emulating a web server can be configured to store HTTP GET request, while honeypot software to be deployed with a sensor emulating a database server can be configured to store structured queries received from one or more other devices (e.g., a sensor emulating a web server). As described below in connection with FIG. 5, honeypot software can be deployed as part of the sensor, can be deployed as software that is executed outside the sensor by the computing device on which the sensor is implemented (e.g., the sensor can be executed in an isolated environment within a virtual machine instance that is executing the honeypot software), and/or can be deployed outside of the computing device on which the sensor is implemented (e.g., the honeypot software can be deployed on another device that is connected to the virtual machine instance on which the sensor is implemented, and can intercept communications to and from the sensor). In some embodiments, the honeypot software can monitor activity and/or processes using any suitable technique or combination of techniques. For example, the honeypot software can implement a network tap to capture and relay traffic to and/from the sensor. As another example, the honeypot software can track changes to system files, running processes, files in a filesystem, requests, login attempts, etc., of the sensor and/or the computing device on which the sensor is implemented.

In some embodiments, sensor provisioning system 112 can generate sensor configuration information 114 that can include properties of the sensor(s), where to deploy the sensor(s), which other application(s) to deploy in connection with the sensor, etc. In some embodiments, sensor provisioning system 112 can provide sensor configuration information 114 to sensor deployment and/or management system 116.

In some embodiments, sensor management system 116 can deploy one or more sensors using sensor instructions 118 to compute resources 120 associated with the user (e.g., user A). Sensor management system 116 can use any suitable technique or combination of techniques to deploy sensors using sensor instructions 118. For example, as described above, the user can give sensor management system 116 permissions to perform certain actions in connection with one or more portions of compute resources associated with the user. In a more particular example, the user can give sensor management system 116 permissions to launch sensors in a particular region(s), availability zone(s), and/or subnet(s) associated with a user in a compute service. For example, a library of images (such as virtual machine images that include an operating system, and one or more applications such as honeypot software, web server software, mail server software, database management software, etc.) can be maintained that are configured to act as sensors when deployed. In this example, sensor management system 116 can submit requests to the compute service to launch one or more instances (e.g., virtual machines or instances that run directly on hardware) in a user's virtual network using sensor instructions 118. As another example, sensor management system 116 can launch one or more sensors 122 in the user's compute resources using one or more software images, which can, for example, represent the entire state of a software application at the time it was imaged, such that the software application can be restored to this point by restoring/launching the software image. Additionally, sensor management system 116 can launch one or more virtual machines including one or more sensors 122 in the user's compute resources using one or more virtual machine images which can, for example, represent the entire state of a virtual machine instance at the time it was imaged, such that a virtual machine instance and any software applications installed on the virtual machine instance can be restored to this point by restoring/launching the virtual machine image.

In some embodiments, compute resources 120 associated with the user (e.g., user A compute resources) can receive instructions for implementing the one or more sensors 122, and can launch a sensor by installing applications specified in sensor instructions 118 and/or by restoring/launching software images included in sensor instructions 118 such that a sensor 122 is implemented by compute resources 120.

As described below in connection with FIGS. 3 and 4, sensor 122, including any suitable applications (e.g., honeypot software, web server software, mail server software, database management software, etc.) can be executed by one or more virtual machine instances, and compute resources 120 can attach any suitable network interfaces to the virtual machine instances and/or containers being executed by the virtual machine instances. In some embodiments, compute resources 120 can include any suitable compute resources associated with the user and/or which the user can access. For example, in some embodiments, compute resources 120 can include a virtual network that includes compute resources made available to the user through a compute service, in which sensor 122 can be deployed using one or more virtual machines, and other virtual machines can be deployed by the user to execute any other suitable applications and/or functions. As another example, compute resources 120 can include compute resources that are available to the user as a service, such as an electronic data storage service, a network-accessible services system that can perform one or more on-demand functions, etc.

In some embodiments, sensor 122 can be configured to emulate any suitable type of computing device. For example, sensor 122 can be configured as a web server, a mail server, a database server, an application server, a load balancer, etc. As another example, sensor 122 can be configured as a web server, and another sensor can be configured as a database server that responds to queries by the web server. As another example, sensor 122 can be configured as a web server, another sensor can be configured as a load balancer, and other sensors can be configured as application servers. In some embodiments, different sensors can be configured with different properties, which may emulate, to some degree, the configuration of the user's compute resources (e.g., the user's virtual network). Additionally, in some embodiments, a sensor can be associated with any other suitable software and/or systems, such as an electronic data store that stores documents that may be enticing to a potentially malicious user (e.g., bait information, decoy information, fame information, etc.).

In some embodiments, sensor 122 can act as a computing resource that can interact with potentially malicious users, and can collect information about network activity to and/or from potentially malicious users. Additionally, in some embodiments, sensor 122 can collect status information about sensor 122, a virtual machine instance being used to implement sensor 122, other applications installed on and/or being executed by the virtual machine instance, etc. Sensor 122 can use any suitable technique or combination of techniques to interact with users and/or collect information. In some embodiments, the user whose compute resources are being used can be inhibited from accessing or making changes to sensor 122.

In some embodiments, sensor 122 (e.g., as implemented by a virtual machine instance) can be exposed to potentially malicious users and/or devices using any suitable technique or combination of techniques. For example, in some embodiments, sensor 122 (and/or a virtual machine instance on which sensor 122 is implemented) can be assigned a public IP address (e.g., by sensor management system 116) that may indicate to an attacker that the sensor is an attractive target, which a potential attacker may discover by querying a Domain Name Server ("DNS") for addresses within a domain of the user (e.g., domains under the second level domain and top level domains example (dot) com). In a more particular example, sensor 122 can be assigned the domain example (dot) com/research, example (dot) com/payroll, or another name that an attacker may find interesting. As another example, a link to sensor 122 can be embedded in a document (e.g., a web page) such that is hidden but discoverable by a potential attacker. As yet another example, identifying information of sensor 122 (e.g., IP address, URL, etc.) can be included in bait information deployed with another sensor.

In some embodiments, sensor 122 can send collected information 124, which can include network activity and/or sensor status information, which can include process activity and/or state changes on sensor 122 and/or the device implementing sensor 122 (e.g., whether any additional applications have been installed; whether any files have been added, deleted, copied, or otherwise exfiltrated; login attempts; users active on the system; information about the performance of sensor 122 and/or a virtual machine instance implementing sensor 122; whether any settings have been changed; commands executed on the system, such as a command for enumerating users of sensor 122; network activity, such as whether scanning for systems to which sensor 122 is connected and/or has communicated with has occurred; etc.) to sensor management system 116 and/or a threat intelligence aggregation system 134. In some embodiments, sensor 122 can send collected information 124 to a message relay service 126. In some embodiments, information can be retrieved from message relay service 126 by sensor management system 116 and/or threat intelligence aggregation system 134, such as sensor status information 128 and/or sensor activity information 132. In such an example, message relay service 126 can be configured as a first-in first-out storage from which the information is sent to sensor management system 116 and/or threat intelligence aggregation system 134 (e.g., in response to a request for such information via frontend 108 and/or communication network 106). In some embodiments, message relay service 126 can be configured such that sensor 122 has permission to store information (e.g., sensor 122 has write permissions), but cannot retrieve information (e.g., sensor 122 lacks read permissions), and cannot overwrite previously submitted information.

In some embodiments, message relay service 126 can be implemented as multiple message relay services, such as one service for handling sensor status information 128 and another service for handling sensor activity information 132. Additionally or alternatively, in some embodiments, sensor 122 can write collected sensor information 124 to an electronic data store associated with computing environment 110, and sensor management system 116 and/or threat intelligence aggregation system 134 can access the information. In some embodiments, activity information can be collected using any suitable techniques, such as a by using packet analyzer software and/or hardware between sensor 122 and other users.

In some embodiments, sensor management system 116 can collect sensor status information 128, and store at least a portion of the information in a sensor status database 130, and can use information from sensor status database 130 to track deployed sensors and/or to evaluate the status of various deployed sensors, which may become less useful as the sensors are compromised.

In some embodiments, threat intelligence aggregation system 134 can collect and analyze activity information (e.g., activity information 132) and/or status information (e.g, status information 128) corresponding to various deployed sensors. In some embodiments, threat intelligence aggregation system 134 can remove identifying information that could be used to identify which user's compute resources were used to deploy the sensor that produced the information. In some embodiments, threat intelligence aggregation system 134 can aggregate the information using any suitable criterion (or criteria). For example, threat intelligence aggregation system 134 can aggregate the information by industry, since malicious activity in the financial services industry may differ from malicious activity in the pharmaceutical industry. As another example, threat intelligence aggregation system 134 can aggregate the information by political boundaries, language, region, etc., as computing systems in different areas may be subject to different types of potential threats due to different infrastructure (e.g., network infrastructure, computing infrastructure), language, operating systems used, etc.

In some embodiments, threat intelligence aggregation system 134 can use the aggregated information to generate threat information that can be used to identify potentially malicious activity. For example, threat intelligence aggregation system 134 can determine IP addresses that are associated with potentially malicious activity. In some embodiments, threat intelligence aggregation system 134 can use any suitable technique or combination of techniques to determine that activity was potentially malicious. For example, in some embodiments, threat intelligence aggregation system 134 can attempt to identify unusual activity using anomaly detection techniques. In such an example, threat intelligence aggregation system 134 can compare network activity to and/or from sensor 122 to network activity to and/or from the user's deployed applications. As another example, threat intelligence aggregation system 134 can evaluate any changes in a status of sensor 122, the virtual machine instance implementing sensor 122, etc., associated with network activity to attempt to identify potentially malicious activity. As yet another example, threat intelligence aggregation system 134 can monitor other systems for network activity related to network activity collected by sensor 122. In a more particular example, decoy information stored in connection with sensor 122 can include information that a malicious user may attempt to use to compromise another computing device and/or a user account, and when such information is used, threat intelligence aggregation system 134 can identify the IP address as being potentially malicious. In some embodiments, when threat aggregation system 134 determines that a particular IP address (and/or other identifying information) is associated with potentially malicious activity, threat aggregation system 134 can seek user input about whether the IP address actually represents a threat. For example, when threat aggregation system 134 identifies activity as being potentially malicious based at least in part on sensor information received from a particular sensor (e.g., sensor 122), threat aggregation system 134 can alert a user associated with compute resources (e.g., compute resources 120) on which the sensor was deployed that particular activity is potentially malicious. In such an example, threat aggregation system 134 can request that the user evaluate the information submitted by the sensor deployed to that user's compute resources (and/or any other information at the user's disposal) and indicate whether the user believes that the activity is actually malicious. Such information can be accessed by the user as part of a web page, in an email, in an application user interface, etc., and feedback can be provided to threat intelligence aggregation system through selection of a user interface element in the web page and/or application user interface, by return email, etc. In such an example, the user can be provided with an incentive to provide such feedback. As another example, threat aggregation system 134 can alert an administrative user (and/or other "expert") that particular activity is potentially malicious, and can request that the administrative user evaluate at least a portion of the sensor information used to come to that conclusion to determine whether the activity is actually malicious. In such an example, the administrative user can submit feedback to threat intelligence aggregation system indicating whether the administrative user believes that the activity is actually malicious. In some embodiments, threat aggregation system 134 can incorporate the feedback about particular activity that is received from a user (e.g., an administrative user, a user associated with compute resources on which the sensor was deployed) when making a determination about whether that activity is to be identified as representing potentially malicious activity.

In some embodiments, threat intelligence aggregation system 134 can generate any suitable threat information 136, and can store threat information in a threat information database 138. In some embodiments, threat information stored in threat information database 138 can be made available to the user associated with computing device 102 and compute resources 120 (and/or any other users that allowed their compute resources to be used to deploy a sensor) using any suitable technique or combination of techniques. For example, threat information database 138 can be used to directly provide (and/or provide access to) threat intelligence generated from sensor information gathered by sensor 122 to the user associated with computing device 102 and compute resources 120 (e.g., as a file, through a web page, through an application, etc.). Additionally or alternatively, in some embodiments, threat information stored in threat information database 138 can be used to provide a feed of threat intelligence, which can be subscribed to by one or more users, which may or may not include the user of computing device 102. Additionally or alternatively, in some embodiments, threat information stored in threat information database 138 can be used to provide threat information for use by a multi-tenant threat intelligence service, which can be used by various users (such as the user associated with computing device 102 and compute resources 120) to determine whether network activity to and/or from their systems is associated with a potentially malicious address, device, user, etc.

In some embodiments, a threat intelligence service can use information from threat information database 138 to identify IP addresses (and/or any other suitable identifying information) that are suspected of being associated with malicious activity based at least in part on sensor information (e.g., sensor information 124) from sensors (e.g., sensor 122) deployed in various users' resources, and the threat intelligence service can use the suspect IP addresses to generate and/or modify an IP address tree. For example, the threat intelligence service can generate an IP address tree that includes any suitable number of nodes that each represent a unique IP address and/or a group of IP addresses (e.g., a group of IP addresses identified as 1.0.0.0/1 in CIDR notation). Such an IP address tree can be structured such that the threat intelligence service can determine whether a particular IP address (e.g., an IP address submitted by a user of the threat intelligence service) is represented in the IP address tree (e.g., by performing a bit comparison at each level of the tree to determine whether the tree includes a particular IP address). Additionally, each IP address in the tree that is included based on threat information database 138 can be associated with information about the potential threat from threat information database 138, such as indicator types, descriptions of the potential threat, information sources, and/or other attributes of the potential threat associated with that IP address (e.g., which can be maintained in threat information database 138). In some embodiments, at least a portion of the IP address tree can represent threat information generated by a service provider associated with computing environment 110 based on aggregated information from many users' compute resources (e.g., as gathered by threat intelligence aggregation system 134). Additionally, in some embodiments, the IP address tree can include IP addresses representing threat information associated with a user of the threat intelligence service (e.g., threat information submitted by the user as part of a blacklist, a whitelist, or threat intelligence downloaded from a third party provider of threat intelligence; threat information in a feed of threat intelligence information to which a user has subscribed in connection with the threat intelligence service, etc.). In some such embodiments, each IP address in the IP address tree (which may or may not be identified in threat information database 138 as being potentially malicious) can be associated with threat information for one or more particular users and/or can be associated with threat information provided by the service provider of the threat intelligence service for the benefit of all users (e.g., threat information generated at least in part using sensor information gathered by threat intelligence aggregation system).

In some embodiments, the threat intelligence service can use one or more virtual machine instances that provide an application that checks an IP address tree for the presence of a particular IP address, and software that maintains an in-memory IP address tree in memory allocated to the virtual machine instance. For example, the virtual machine instance can receive parsed log information that includes one or more IP addresses from the threat intelligence service. In such an example, the virtual machine instance can use the software to determine whether each IP address is in the in-memory IP address tree, and can use the software to return information about whether each IP address is included in the in-memory IP address tree. More particularly, when an end user-generated communication, such as a request to use a customer's compute resources, is received by the system, the virtual machine instance can use the software to identify the customer from the request, and also to identify an IP address of interest, such as the source IP address or the IP address of resources identified in the request. The software can enable the virtual machine instance to convert the IP address into bit-format, and the virtual machine instance can begin to scan a corresponding path in the in-memory IP address tree. If in tracing the path through the tree that is prescribed by the IP address the virtual machine instance reaches a node of the tree that contains information, the IP address can be considered potentially malicious; otherwise, the IP address is not currently marked as potentially malicious. If the IP address is potentially malicious, the virtual machine instance can determine if the customer is associated with the node. For example, the virtual machine instance may determine whether the customer is subscribed to the threat intelligence feed that the IP address is associated with, as identified by the information in the node of the tree. If so, then the virtual machine instance can send a response to the service indicating that a threat was identified. Additionally or alternatively, the virtual machine instance can use the software to update the endpoint identifiers (i.e., the nodes of the in-memory IP address tree), such as my merging customer-supplied malicious resource lists with the tree as described above.

In some embodiments, an IP address submitted to the threat intelligence service by a user for comparison to potentially malicious IP addresses in the IP address tree (e.g., submitted as part of log information about activity of the user's compute resources) may match an IP address in the in-memory IP address tree even if the IP address is not associated with threat information provided by the service provider (e.g., universal threat information that is common to all users of the threat intelligence service), or threat information specific to the user that submitted the log information that includes the IP address for comparison to the IP address tree. For example, the in-memory IP address tree can include the IP address from the log information in association with threat information submitted by another user (but not submitted by the user associated with the log information). In some embodiments, the threat intelligence service can inhibit any action(s) (e.g., sending an alert and/or message, storing an alert and/or message in an electronic data store associated with the user, including the threat information in a document that is accessible to the user) from being taken in connection the threat information associated with that IP address using any suitable technique or combination of techniques. For example, the threat intelligence service can inhibit an action from being taken by moving to a next IP addresses submitted by the user without performing any further actions. As another example, the threat intelligence service can inhibit the user from being notified, but can take another action, such as recording information indicating that the IP addresses was identified as being potentially malicious in association with an indication of the source of the threat information submitted by another user in association with that IP address. In such an example, if the user later uploads or otherwise becomes associated with the same threat information from the same source, the threat intelligence service can indicate that previous activity was detected as being potentially malicious as part of a process of associating the newly associated threat information with the IP address tree.

Note that, although the threat intelligence service is generally described above as identifying potentially malicious IP addresses (e.g., from IP addresses submitted by users), this is merely an example, and any suitable identifying information related to network activity can be used to identify potentially malicious activity. For example, URLs and/or domains can be identified using a hash table in which each URL and/or domain corresponds to an output of a hash function. In such an example, each URL and/or domain submitted by a user to be screened by the threat intelligence service can be hashed using the hash function and compared against existing outputs to determine whether any of the URLs and/or domains submitted by a user is associated with potentially malicious activity. As another example, URLs and/or domains can be identified using a prefix tree in which top level domains are at the roots, and successive parts of a domain name branch at each level. In a more particular example, if threat information includes the domains http (colon)//www (dot) example (dot) com, and https (colon)// example1 (dot) net, the prefix tree can include roots for top level domains ".com" and ".net," with hierarchies descending such that the second-level domain name "example" forms a node below ".com" and "example1" forms a node below ".net," and so on. As yet another example, in addition to or in lieu of the IP address tree, IP addresses, domain names, etc., can be maintained in a relational database and/or non-relational database using the identifying information (or, e.g., a hash of the identifying information) as a key. As still another example, any other activity can be included in threat information maintained by the threat intelligence service and/or submitted for screening by a user of the threat intelligence service. In a more particular example, the user can submit signatures of files uploaded to and/or downloaded by the user's compute resources, and the threat intelligence service can compare the signatures to signatures in threat information maintained for the benefit of that particular user, and/or to signatures in threat information maintained for the benefit of all users (e.g., universal threat information). As another more particular example, users of the threat intelligence service can submit information about other process activity such as database queries submitted to the user's compute resources, state changes (e.g., registry keys, settings, credentials, permissions, etc.) to the user's compute resources, etc. The threat intelligence service can check such information against threat information using any suitable data structure.

In some embodiments, threat information database 138 and sensor status database 130 can be implemented using any suitable techniques. For example, each of the databases can be implemented as a relational database or a non-relational database. Note that sensor status database 130 and threat information database 138 are merely given as examples, and sensor status information and threat information can be maintained using any suitable data structure (e.g., a file system), and using any suitable number of data structures.

In some embodiments, threat intelligence aggregation system 134 can provide threat information to one or more administrative users (and/or computing devices), which can evaluate the threat information for patterns and/or trends in activity by potential attackers. For example, such an administrative user and/or computing device can attempt to identify patterns in what types of files potential attackers are searching for when interacting with sensors (e.g., sensor 122), which may be associated with empty search results or file not found messages. Based on such patterns, the administrative user can cause sensors (e.g., sensors that are deployed, and/or sensors that have not yet been deployed) to include files of the type being searched for in a file system (note that the files may include any information, such as text from a book, tables of government data, public domain, images, etc., that can replicate the size of a file that the potential attacker expects a file of the type being searched for to have without exposing any potentially useful information to the attacker). In some embodiments, the administrative user(s) and/or computing device(s) can create one or more files of the types being searched for by potential attackers, and cause the one or more files to be stored in a file system on a volume or a file system in an elastic storage system. In some embodiments, when provisioning sensors, sensor management system 116 can provide instructions for attaching the file system on the volume or the file system in the elastic storage system to the sensor when it is deployed such that the newly created files are accessible by the deployed sensor. Additionally, in some embodiments, sensor management system 116 can send the newly created files to sensors that have already been deployed (e.g., sensor 122) for storage in the file system by the sensor, and/or can store the newly created files in a file system attached to the already deployed sensor (e.g., a file system in the elastic storage system) by transferring the files into the file system, adding a reference to the files to the file system, etc.

Figure 1B:
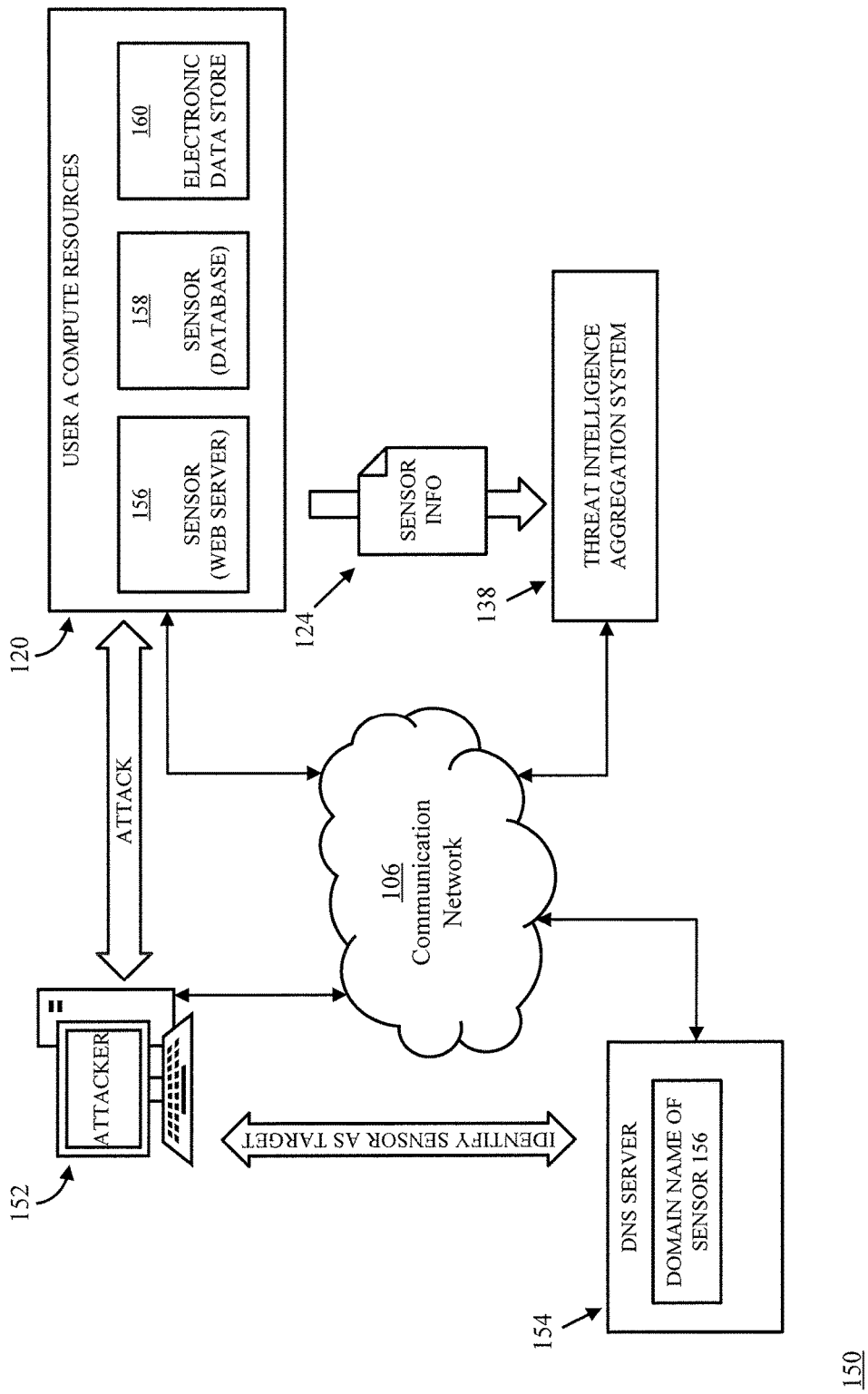

FIG. 1B depicts another example of a system 150 for collecting threat intelligence in accordance with some embodiments of the disclosed subject matter. As shown in FIG. 1B, an attacker 152 can access a DNS server 154 to attempt to identify targets for infiltration. In some embodiments, a sensor (e.g., sensor 156) can be assigned a domain name that is intended to draw the attention of an attacker. Such a domain name can be assigned by any suitable system, such as sensor management system 116 (e.g., based on information generated by sensor provisioning system 112). Attacker 152 can use the domain name identified by querying DNS server 154 to attempt to access sensor 156, which can be configured as a web server and can be executed within user A's compute resources. If the attacker can access sensor 156 and compromise it, the attacker may use the sensor to initiate a port scan to identify other systems with which sensor 156 can communicate. For example, sensor 156 can indicate to attacker 152 that it can communicate with a database, implemented using sensor 158 that is configured as a database, and an electronic data store 160 (note that electronic data store 160 can be provided as a service from outside of user A's compute resources, in some embodiments) that can be configured to appear to be a file repository associated with a file system of sensor 156 and/or a data repository for sensor 158. As described above in connection with FIG. 1A, sensors 156 and/or 158 can send sensor information 124 with identifying information of any computing devices that communicated with the sensor (e.g., IP address, MAC address, etc.), identifying information of commands and/or other messages that were received from attacker 152, information identifying operations (or types of operations) that were performed (e.g., accessing a file system, copying a file, enumerating user credentials, etc.) by the sensors in response to information sent by attacker 152, whether any files were uploaded to a sensor, etc. In some embodiments, attacker 152 can be associated with any suitable computing device or network of devices, such as a personal computer, a laptop computer, a tablet computer, a smartphone, a server, etc., which can be configured to communicate over communication network 106. In some embodiments, attacker 152 can be a malicious user and/or a program being executed by a computing device (e.g., malware being executed by a computing device associated with a user that is unaware that the computing device is communicating with sensor 156). In some embodiments, attacker 152 can be an internal endpoint that is within the user's compute resources (i.e., an internal threat), or a remote endpoint that is not within the user's compute resources (i.e., an external threat). A remote endpoint can be any computing device that is located outside of the user's compute resources and, in cases, not associated with the service provider of the compute resources and/or computing environment 110. For example, a remote endpoint can be a computing device that communicates (and/or attempts to communicate) with the user's compute resources from an IP address that is not within a subnet associated with the user's compute resources (which may include one or more subnets associated with the user that are not provided by the compute resource virtualization platform, e.g., corresponding to a corporate intranet associated with the user).

Figure 2:
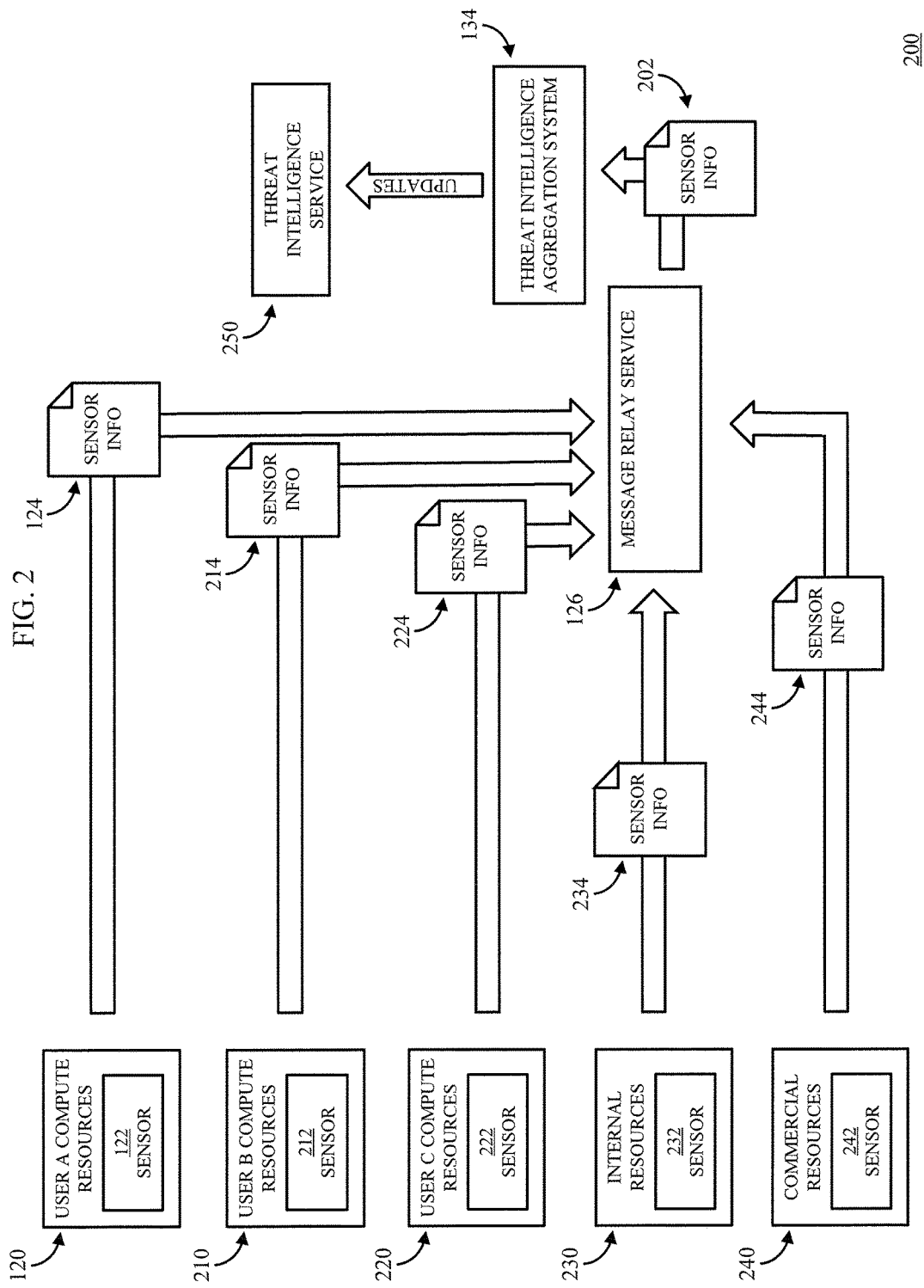
FIG. 2 is a diagram of an example of a system with multiple sources of sensor information that can be used to collect information that can be used to generate threat intelligence in accordance with some embodiments of the disclosed subject matter.

FIG. 2 shows an example of a system 200 with multiple sources of sensor information that can collect information that can be used to generate threat intelligence in accordance with some embodiments of the disclosed subject matter. As shown in FIG. 2, threat intelligence aggregation system 134 can retrieve sensor information 202 from message relay service 124, which can receive sensor information from various different sensors deployed in a variety of systems. In some embodiments, as described above in connection with FIG. 1A, message relay service 126 can be configured such that various computing devices can provide information to message relay service 126, and one or more devices can be authorized to retrieve information from message relay service 126. For example, threat intelligence aggregation system 134 can be authorized to retrieve information from message relay service 126 that was submitted from a variety of computing devices being used to implement sensors. In such an example, threat intelligence aggregation system 134 may not be permitted to choose which particular information to read from message relay service 126, and may be limited to requesting one or more files, which can be provided on a first-in, first-out basis.

As shown in FIG. 2, sensor 122 that is implemented by compute resources 120 associated with a first user (e.g., user A) can provide sensor information 124 to message relay service 126 (e.g., via communication network 106). Additionally, a sensor 212 that is executed by compute resources 210 associated with another user (e.g., user B) can provide sensor information 214 to message relay service 126. Sensor 212 can be configured similarly or differently from sensor 122. For example, sensor 122 can be configured to appear to be associated with a financial services company, while sensor 212 can be configured to appear to be associated with a pharmaceutical company. Similarly, a sensor 222 that is implemented by compute resources 220 associated with yet another user (e.g., user C) can provide sensor information 224 to message relay service 126, a sensor 232 that is implemented by compute resources 230 that are associated with a service provider of the threat intelligence aggregation system 134 (e.g., the service provider's internal resources) can provide sensor information 234 to message relay service 126, and a sensor 242 that is implemented by compute resources 240 that are provided by a third-party provider of compute resources (e.g., a commercial source of resources) can provide sensor information 244 to message relay service 126. As described above in connection with FIG. 1A, threat intelligence aggregation system 134 can use sensor information from the various sensors to generate threat information that can, in some cases, be particularly relevant to a particular country or group of countries, geographic region, industry, language, operating system, etc.

In some embodiments, threat intelligence aggregation system 134 can provide threat information to any suitable computing device and/or user. For example, in some embodiments, threat intelligence aggregation system 134 can provide threat information to a threat intelligence service 250, which can use the threat information to identify potentially malicious activity. As another example, in some embodiments, threat intelligence aggregation system 134 can provide threat information to one or more users that had a sensor deployed in their compute resources. As yet another example, in some embodiments, threat intelligence aggregation system 134 can provide threat information to one or more administrators of threat intelligence aggregation system 134 and/or threat intelligence service 250 for human analysis. As still another example, in some embodiments, threat intelligence aggregation system 134 can provide threat information to a provider of threat intelligence (e.g., a provider of a threat intelligence feed).

Figure 3:
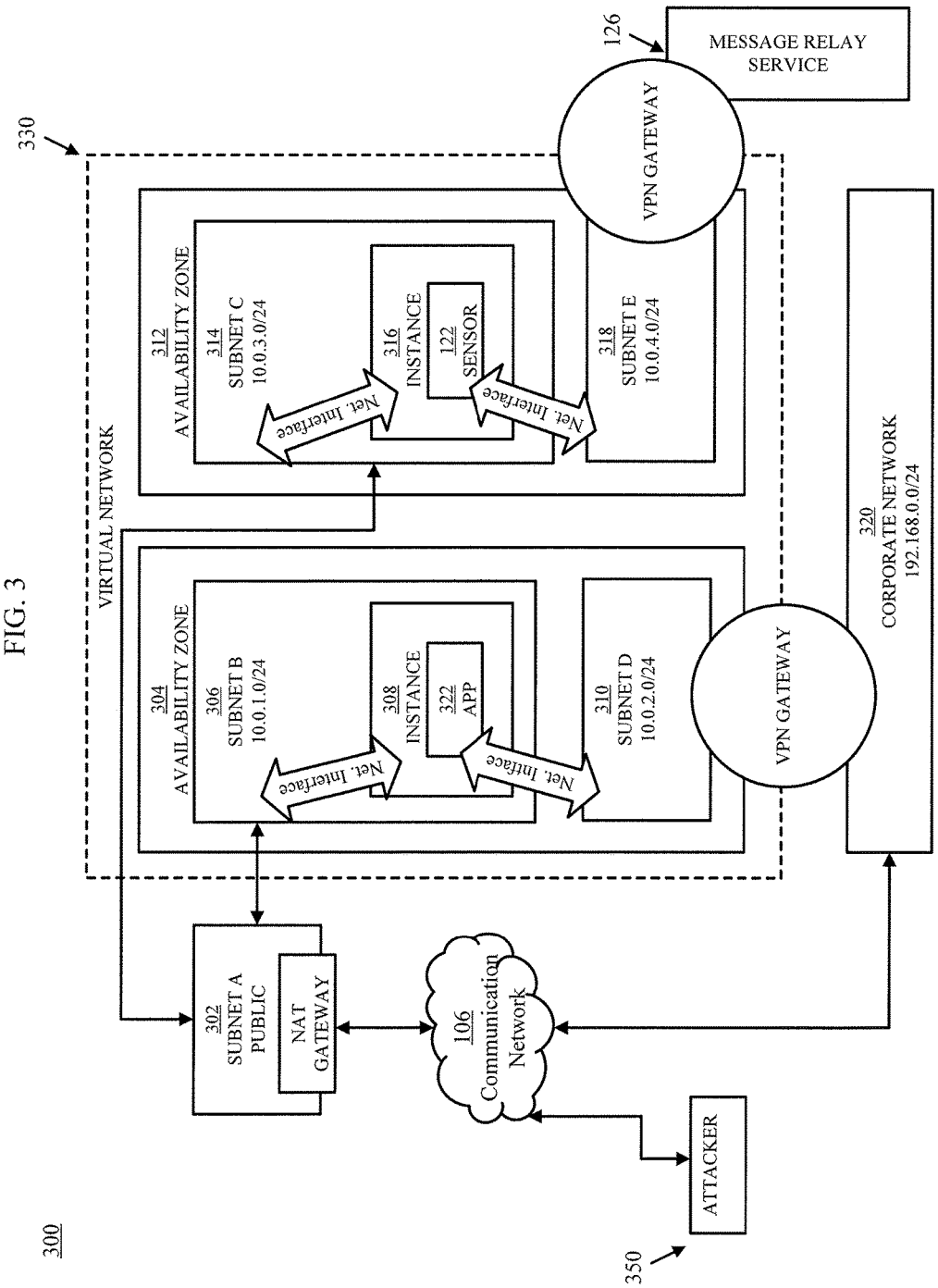
FIG. 3 is a diagram of an example system including a virtual network system that can be configured in accordance with some embodiments of the disclosed subject matter.

FIG. 3 shows an example of a system 300 including a virtual network that can be configured to implement a sensor for collecting threat information in accordance with some embodiments of the disclosed subject matter. As shown in FIG. 3, a virtual network 330 associated with a user (e.g., user A, an owner of corporate network 320, etc.) can have an IP address range (e.g., 10.0.0.0/16) and can be associated with various subnets, such as a subnet A 302 which can provide a connection between virtual network 330 and communication network 106, which can be a public network, such as the Internet, via a network address translation (NAT) gateway. Virtual network 330 can be implemented across multiple availability zones, such as a first availability zone 304 and a second availability zone 312. As shown, availability zone 304 can include a first subnet 306 ("Subnet B") associated with a particular IP address range (e.g., 10.0.1.0/24) and a second subnet 310 ("Subnet D") associated with another IP address range (e.g., 10.0.4.0/24). Availability zone 312 can include similar subnets, such as a subnet 314 ("Subnet C") associated with a particular IP address range (e.g., 10.0.2.0/24) and a subnet 318 ("Subnet E") associated with another IP address range (e.g., 10.0.4.0/24). In some embodiments, the different subnets can have different routing rules, for example implemented using a routing table, which can include multiple routes that can each specify a Classless Inter-Domain Routing (CIDR) destination(s) and a target (e.g., a particular gateway). For example, the routing table for subnet B can include routing traffic directed to an IP address in the range 0.0.0.0/0 to the NAT gateway and routing traffic directed to an IP address in the range 10.0.0.0/16 internally within virtual network 330. As another example, subnet D can have a routing table that includes routing traffic directed to an IP address in the range 10.0.0.0/16 internally within virtual network 330, and routing traffic directed to an IP address in the range 192.168.0.0/24 to the Virtual Private Network ("VPN") Gateway that is coupled to corporate network 320. Whereas, in some embodiments, a routing table for subnet C can include routing traffic directed to an IP address in the range 0.0.0.0/0 to the NAT gateway and routing traffic directed to IP address corresponding to subnet C or Subnet D internally within availability zone 312. As another example, subnet D can have a routing table that includes routing traffic directed to IP addresses corresponding to subnet C or Subnet D internally within availability zone 312, and routing traffic directed to an IP address corresponding to message relay service 126 through a VPN gateway that is coupled to message relay service 126. In such an example, instances (e.g., instance 308) executing an application 322 for the user in availability zone 304 can be isolated from instances (e.g., instance 316) executing a sensor 122. This can, in some cases, provide some additional protection against a malicious user potentially compromising the user's actual compute resources when interacting with sensor 122.

In some embodiments, an attacker 350, which can be any type of endpoint (e.g., an internal endpoint that is within the user's compute resources or a remote endpoint that is not within the user's compute resources), can attempt to access one or more applications within virtual network 330, such as sensor 122 being executed by VM instance 316. In some embodiments, attacker 350 can communicate with sensor 122 over the virtual network. In some embodiments, security rules attached to sensor 122 can be configured to be relatively lax such that attacker 340 can gain access to sensor 122. For example, a firewall associated with sensor 122 can be configured with security rules permitting communications that are not permitted to other computing devices in the private network. In a more particular example, the firewall can be configured to open one or more ports that are ordinarily closed and that are known to be used by malicious users. Additionally, in some embodiments, a firewall associated with a virtual machine instance used in the user's production environment (e.g., virtual machine instance 308) can be configured to block (and/or otherwise inhibit) communications from sensors (e.g., sensor 122) deployed in the user's compute resources. In a more particular example, the firewall associated with virtual machine instance 308 can be configured to block communications from an IP address associated with sensor 122, an IP address used by a virtual network interface attached to sensor 122 or virtual machine instance 316, IP address in subnet C or subnet E, computing devices in availability zone 312, etc.

Figure 4:
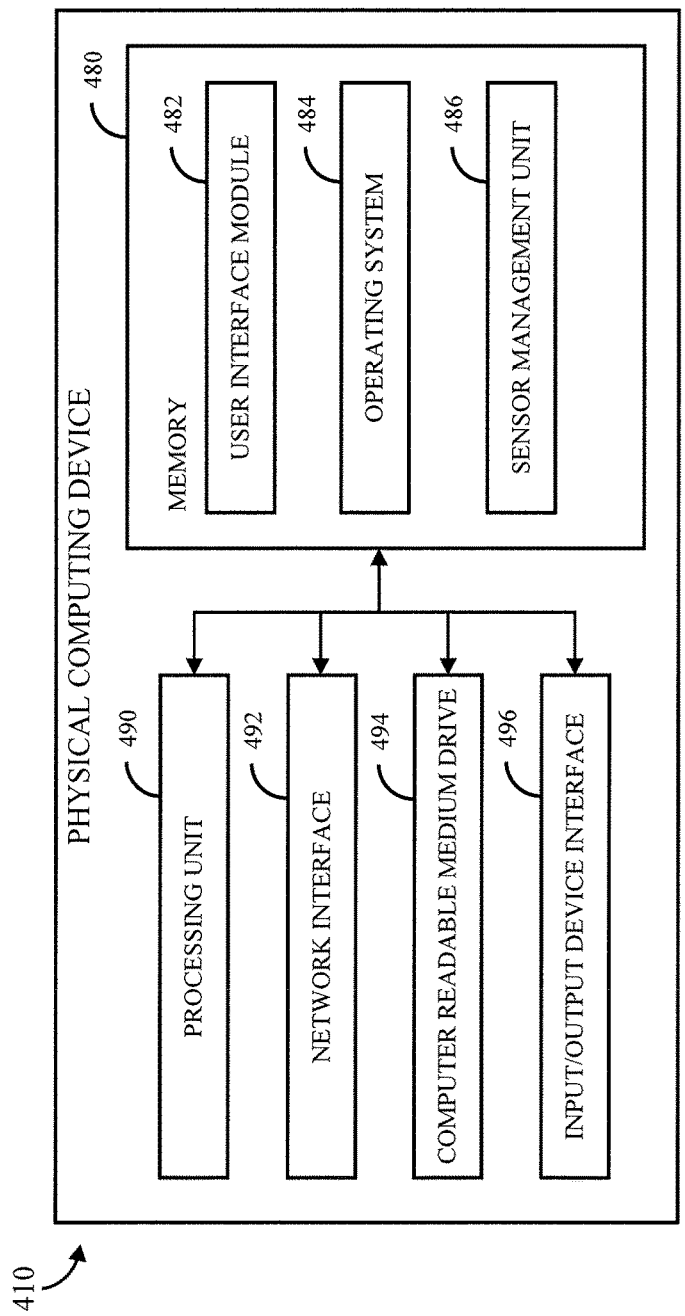
FIG. 4 is a diagram of an example general architecture of a computing system that deploys and/or monitors various sensors (e.g., honeypots) that can be used to generate threat information about potentially malicious activity in accordance with some embodiments of the disclosed subject matter.

FIG. 4 shows an example of a general architecture of a physical computing device (e.g., a server) that can be used to provide access to at least a portion of the mechanisms described herein (e.g., as a portion of sensor provisioning system 112, as a portion of sensor management system 116, as a portion of threat intelligence aggregation system 134, etc.) to deploy and/or monitor various sensors that can be used to generate threat information about potentially malicious activity in accordance with some embodiments of the disclosed subject matter. The general architecture of physical computing device 410 depicted in FIG. 4 includes an arrangement of computer hardware and/or software modules that can be used to implement aspects of the disclosed subject matter. The hardware modules may be implemented with physical electronic devices, as described below, and physical computing device 410 can include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIG. 1A. As illustrated, physical computing device 410 includes a processing unit 490, a network interface 492, a computer readable medium drive 494, and an input/output device interface 496, all of which can communicate with one another by way of a communication bus. Network interface 492 can provide connectivity to one or more networks or computing systems. The processing unit 490 can thus receive information and instructions from other computing systems or services via communication network 106. Processing unit 490 can also communicate to and from memory 480 and further provide output information for an optional display (not shown) via the input/output device interface 496. The input/output device interface 496 can also accept input from one or more optional input device (not shown).

Memory 480 can contain computer program instructions (e.g., grouped as modules in some embodiments) that processing unit 490 executes in order to implement one or more aspects of the disclosed subject matter. In some embodiments, memory 480 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 480 can store an operating system 484 that provides computer program instructions for use by processing unit 490 in the general administration and operation of sensor management system 116. Memory 480 can further include computer program instructions and other information for implementing aspects of the disclosed subject matter. For example, in some embodiments, memory 480 can include a user interface module 482 that generates user interfaces (and/or instructions therefor) for display upon a computing device, e.g., via a navigation and/or browsing interface such as a browser or application installed on the computing device. In addition, memory 480 can include and/or communicate with one or more data repositories (not shown), for example, to receive sensor provisioning information, retrieve software images, libraries, etc.

In some embodiments, memory 480 can include a sensor management unit 486 that may be executed by processing unit 490 to provide at least a portion of computing environment 110. For example, in some embodiments, physical computing device 410 can execute a virtual machine instance that can use sensor management unit 486 to implement at least a portion of the sensor management system 116. In a more particular example, as described below in connection with FIG. 5, sensor management unit 486 can include one or more software images that can be used by a virtual machine instance to implement a portion of sensor management system 116 (e.g., by receiving sensor configuration information, by deploying sensors to users' compute resources, by receiving sensor status information, etc.).

Figure 5:
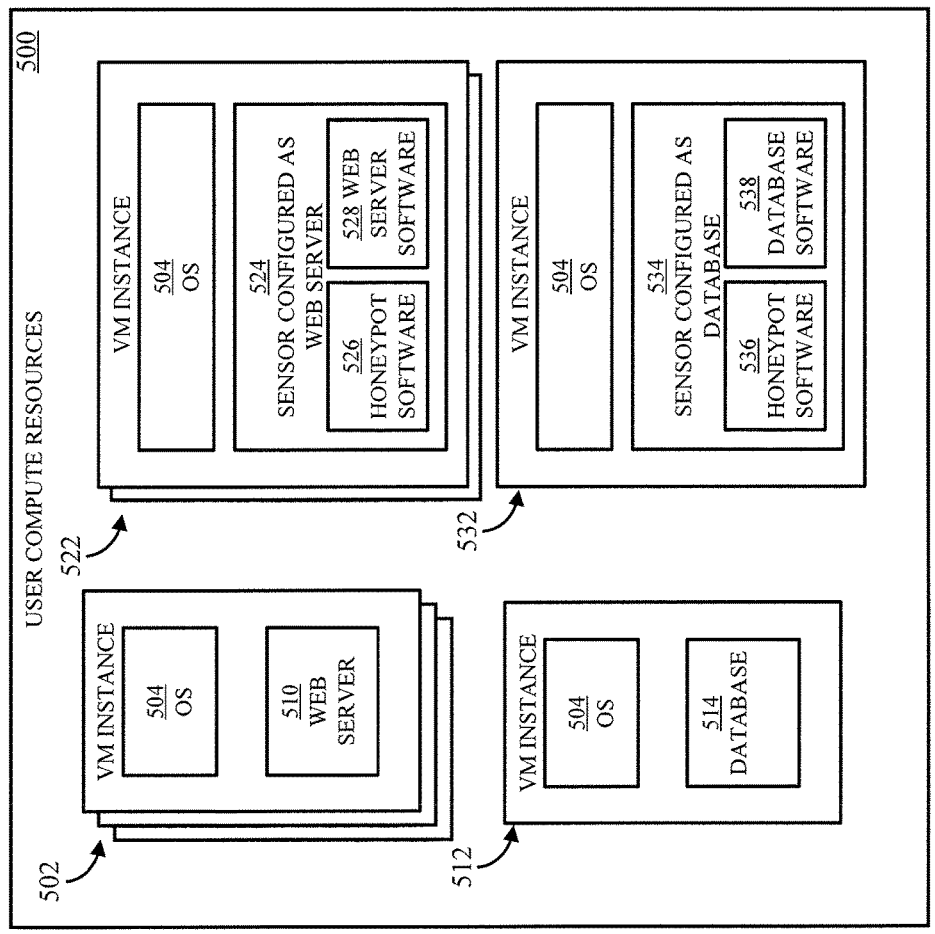
FIG. 5 is a diagram of an example compute resource virtualization platform that can be used to implement one or more portions of system shown in FIG. 1A in accordance with some embodiments of the disclosed subject matter.

FIG. 5 shows an example of a portion of user compute resources 500 that can be used to implement one or more portions of system 100 shown in FIG. 1A in accordance with some embodiments of the disclosed subject matter. In some embodiments, virtual machine instances deployed in user compute resources 500 can be provided through a compute resource virtualization platform that provides access to virtual machines that can launch and execute a variety of applications from software images. For example, in some embodiments, user compute resources 500 can include any suitable number of virtual machines, such as virtual machine instances 502, 512, 522, and 532. In some embodiments, a "virtual machine instance" can refer to a specific allocation of virtual computing resources that has the properties of a particular virtual machine (VM) and is configured to launch and run software containers. In some embodiments, virtual machine instance 502, can run software to provide functionality of a web server a software image provided by a user of the virtual machine instance.

As shown in FIG. 5, VM instance 502 can have an OS 504, and software 510 for providing web server functionality, and a VM instance 512 can have an OS 504, and software 514 for providing database management functionality. In some embodiments, a user associated with compute resources 500 can deploy VM instances 502 and 512 to provide a web page using a web server implemented by VM instance 502 that can access information from a database implemented using VM instance 512. In some embodiments, VM instances 502 and 512 can be part of the user's production computing environment. As shown in FIG. 5, user compute resources 500 can be used to deploy multiple virtual machine instances 502 that can, for example, replicate the functionality of the web server implemented using web server, to which incoming traffic can be distributed using a load balancer (which can, for example, be implemented using another virtual machine instance). In some embodiments, based on the configuration of the user's compute resources, sensor provisioning system 112 can determine that sensors configured to appear to be a web server and a corresponding database can be deployed to the user's compute resources 500 to appear to be similar to systems deployed by the user. For example, sensor provisioning system 112 can determine that a sensor 524 using OS 504 is to be deployed with honeypot software 526 for collecting and sending sensor information (e.g., sensor information 124) to sensor management system 116 and/or threat intelligence aggregation system 134, and web server software 528 that is similar to the software used by web server 510. As another example, sensor provisioning system 112 can determine that another sensor 534 using OS 504 is to be deployed with honeypot software 536 for collecting and sending sensor information (e.g., sensor information 124) to sensor management system 116 and/or threat intelligence aggregation system 134, and database software 538 that is similar to the software used by database 514.

In some embodiments, sensor management system 116 can deploy sensor 524 by using virtual machine instance 522 to launch one or more software images that include honeypot software 526 and/or web server software 528. In some embodiments, honeypot software 526 can record information about the operation of web server software 528 and/or operation of virtual machine instance 522, such as: whether any additional applications have been installed on virtual machine instance (e.g., malware installed by a potential attacker); whether any files have been added to a file system attached to sensor 524 (e.g., for use by web server software 528); whether any files have been deleted, copied, or otherwise exfiltrated from a file system attached to sensor 524; login attempts; users active on the sensor 524 and/or virtual machine instance 522; information about the performance of sensor 524 and/or virtual machine instance 522; whether any settings have been changed in web server software 528 and/or virtual machine instance 522; commands executed on virtual machine instance 522, such as a command for enumerating users of virtual machine instance 522; network activity, such as whether scanning for systems to which sensor 524 is connected and/or has communicated with has occurred; etc.

In some embodiments, honeypot software 526 can be deployed as part of sensor 524 as shown in FIG. 5. For example, honeypot software 526 can run as an application associated with web server software 528 and/or as part of web server software 528. Additionally or alternatively, in some embodiments, honeypot software 526 can be deployed outside of sensor 524 and/or outside of virtual machine instance 522. For example, sensor 524 can be configured as a virtual machine or a collection of one or more container instances being executing by virtual machine instance 522, and honeypot software 526 can be executed by virtual machine instance 522 or one or more other containers being executed by virtual machine instance 522, which can facilitate isolation of honeypot software 526 and web server software 528. As another example, in some embodiments, honeypot software 526 can be executed outside of virtual machine instance 522. In a more particular example, honeypot software 526 can be implemented as part of a virtualization system of a physical computing device executing virtual machine instance 522. In another more particular example, honeypot software 526 can be executed by a virtual machine instance in user compute resources 500 that can access network traffic to and/or from virtual machine instance 522 and/or sensor 524 (e.g., such a virtual machine instance can be configured as any suitable computing device, such as a proxy server between virtual machine instance 522 and the attacker, or a router serving virtual machine instance 522). In such an example, honeypot software 526 can be implemented as a packet sniffer, a network tap, or other system that records network traffic.

In some embodiments, honeypot software 526 can use any suitable technique or combination of technique to record activity by sensor 524. For example, as described above, honeypot software 526 can include software that records network traffic, such as a network tap or packet sniffer. As another example, honeypot software 526 can take a snapshot of the system files, files in a file system of virtual machine instance 522, registry entries, and running processes of virtual machine instance 522 periodically (at regular and/or irregular intervals), which can be used (e.g., by threat intelligence aggregation system) to determine whether the state of the virtual machine instance has changed. As yet another example, honeypot software 526 can log credentials submitted to web server software 528 and/or virtual machine instance 522. As still another example, honeypot software 526 can log activity by web server software 528, such as queries that are submitted, requests that are submitted, ports that are scanned, etc. In some embodiments, honeypot software 536 can be implemented in a similar fashion to honeypot software 526, but can record less and/or additional attributes, such as database queries received, write requests, read requests, etc.

Figure 6:
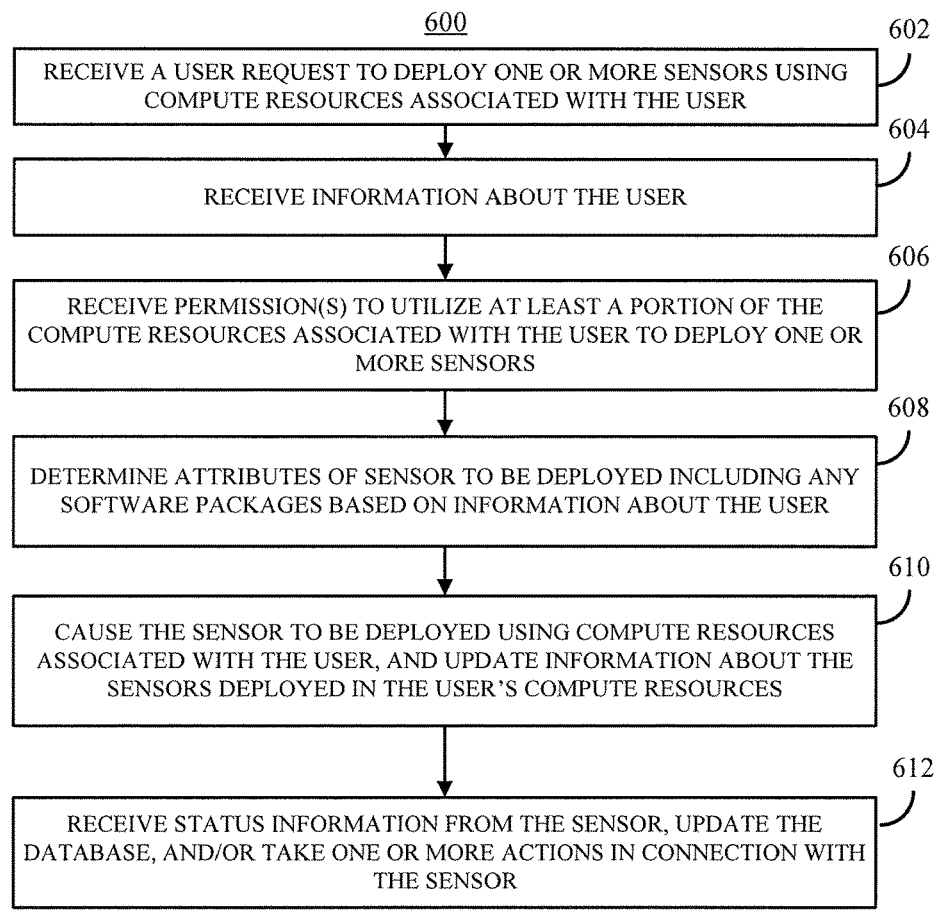
FIG. 6 is a flowchart of an example process for deploying and monitoring sensors using compute resources associated with a user in accordance with some embodiments of the disclosed subject matter.

FIG. 6 shows an example 600 of a process for deploying and monitoring sensors using compute resources associated with a user in accordance with some embodiments of the disclosed subject matter. As shown in FIG. 6, at 602, process 600 can receive a user request to deploy one or more sensors using compute resources associated with the user. For example, frontend 108 can receive a web service request identifying a user account and including a request to deploy a sensor. In some embodiments, the request can also include a request for a specific type of sensor or a request for the service provider to select a sensor that matches the customer's environment. In some embodiments, the request can also specify where to deploy the sensor. For example, the request can identify a virtual network, a subnet, or indicate that a new virtual network or subnet are to be created to hold the sensor. In some embodiments, a user can be given an incentive to deploy such sensors. For example, the user can be provided access to threat intelligence generated from the sensor(s), and/or other threat intelligence available from the provider of the sensor(s). As another example, the user can be provided with access to additional and/or discounted compute resources (in excess of the compute resources allotted to the sensor(s)) in exchange for deploying the sensor(s) using compute resources associated with the user. As yet another example, the user can be provided with monetary compensation. In some embodiments, the request can be submitted through a user interface (e.g., provided by frontend 108).

At 604, process 600 can receive information that can be used to configure the sensor(s), and/or to classify the threat intelligence derived from information collected by the sensor(s). For example, as described above in connection with FIG. 1A, the information can include information about the type of sensor to deploy. For example, the customer may have indicated the type of sensor to deploy in the request. As another example, the user may have provided information about the type of resources that would exist within the customer's resources, such as industry information, location information, network configuration information, preferences regarding where the sensor is deployed (e.g., subnets), etc. In some embodiments, process 600 can cause a user interface that allows a user to provide such information to be presented to a user (e.g., by computing device 102), and the user can provide information through the user interface. Additionally or alternatively, in some embodiments, at 604, process 600 can request that the user grant permission to sensor provisioning system 112 to gather information about how the user is using compute resources and/or how the compute resources are deployed from the user's account information, such as the type of virtual machine instances the customer has deployed, etc., which the user can grant via a user interface (which may require one or more methods of authentication) that process 600 caused to be presented to the user.

At 606, process 600 can request that the user grant permission to process 600, and services and/or systems associated with process 600 (e.g., sensor deployment and management system 116), to deploy sensors to compute resources associated with the user, manage such sensors, create and/or attach virtual network interfaces, submit network security rules to be used in connection with the virtual network interfaces, decommission the sensors, deploy software (e.g., software packages) to the user's compute resources in connection with sensor, etc.

At 608, process 600 can determine one or more attributes of a sensor to be deployed using the compute resources associated with the user based on the information received at 604. For example, process 600 can determine where in the user's compute resources to deploy a sensor (or sensors), such as a region, an availability zone within a region, a subnet within the user's virtual network, etc. As another example, process 600 can determine how to configure the sensor(s). In a more particular example, process 600 can determine whether to configure the sensor as a web server, a mail server, a database server, etc., based on the information received at 604. In such an example, if the user indicates (or process 600 determines) that the user's network is configured with a web server that interacts with computing devices over the Internet, and a database server that interacts with the web server within the user's virtual network, process 600 can determine that at least two sensors are to be deployed with a similar configuration. As yet another example, process 600 can determine whether, and which, software to deploy in connection with the sensor. In such an example, based on the industry that the user is in, process 600 can identify a group of software applications to deploy with the sensor based on commonly used software in that industry. In a more particular example, if the user identifies their industry as financial services, process 600 can determine that a group of applications commonly used by financial services companies is to be deployed in connection with the sensor. Deploying such software can, in some cases, make an attacker less suspicious that they are interacting with a sensor than if the sensor were deployed without software, or if software is deployed, but it is not the type of software the attacker would expect to be deployed by a financial services company. Additionally, in some embodiments, process 600 can also generate and/or select decoy content that can be made accessible to the sensor, which can give an attacker information to extract, which may lessen the attackers suspicions and/or provide an opportunity to gain additional information by distributing known counterfeit information that can be recognized as such, identifying the supplier of the information as a potential source of malicious traffic.

In some embodiments, process 600 can select one or more types of sensors and/or information to deploy using any suitable technique or combination of techniques. For example, process 600 can cause a user interface to be presented to a user with templates that represent different network topologies, and a user can select a template that most closely resembles the types of compute resources and/or the network topology of the user's compute resources. As another example, process 600 can cause a user interface to be presented to a user with a list of types of systems that the user can select as corresponding to a system deployed as part of the user's compute resources and/or the network topology. As still another example, process 600 can access (with explicit permission from the user) the user's compute resources to determine which systems are deployed and/or a network topology of the user's compute resources. In a more particular example, process 600 can scan metadata of machine images used by the user to launch virtual machine instances to determine which types of machine images are used. In such an example, the metadata can include information identifying whether the machine image that can be used to implement a database using database software distributed by Oracle® (e.g., Oracle Database), a machine image that can be used to implement a web server using software distributed by Apache® (e.g., Apache HTTP Server), a machine image that can be used to implement a servlet container using software distributed by Apache® (e.g., Apache Tomcat® Server), etc.

In some embodiments, process 600 can maintain a data structure (e.g., a table) that includes types of machine images deployed by users, and corresponding types of sensors that can be deployed to users' compute resources. For example, in some embodiments, if process 600 determines that the user maintains a machine image corresponding to a particular web server software, process 600 can determine from the data structure, whether a software image for a sensor that is configured to appear to be a web server implemented using the same (or similar) web server software is available. If such an image is available, process 600 can include identifying information of the software image of the sensor for use in deploying the sensors. In some embodiments, process 600 can use machine learning techniques to determine which sensors correspond to which types of machine images used by user's, to determine which sensors are sufficiently similar to particular types of machine images used by user's, and/or to configure a new software image for a sensor that is similar to the software implemented by a machine image of the user (e.g., if a sufficiently similar sensor is unavailable), etc. Additionally or alternatively, an administrator can maintain the data structure by determining which machine images correspond to particular sensors that can be deployed, determining which sensors are sufficiently similar to particular types of machine images used by user's, and/or to configuring a new software image for a sensor that is similar to the software implemented by a machine image of the user (e.g., if a sufficiently similar sensor is unavailable), etc.

At 610, process 600 can cause one or more sensors configured using attributes determined at 608 and, in some cases, associated applications to be to be deployed using compute resources associated with the user. In some embodiments, process 600 can use any suitable technique or combination of techniques to deploy the sensor(s) and applications using the compute resources associated with the user. For example, in some embodiments, process 600 can send a request to a compute service to provision one or more virtual machines into the compute resources associated with the user. In such an example, process 600 can make such a request on behalf of the user using permissions granted by the user. As another example, in some embodiments, process 600 can configure an entirely separate virtual network that is similar to the user's virtual network in that it has a similar network topology and includes sensors based on machine images that are similar to the machine images used by the customer, but that does not have any direct connections to the user's virtual network or any compute resources within the user's virtual network. As yet another example, process 600 can configure one or more subnets to include the sensor(s) and any suitable applications to be executed in connection with the sensor(s). In some embodiments, process 600 can provide software images that can be used to launch the sensor(s) and any other suitable applications to be executed in connection with the sensor(s). Additionally or alternatively, process 600 can cause the compute resources to install the sensor(s), and any other suitable applications to be executed in connection with the sensor(s).

In some embodiments, in connection with deploying a sensor, process 600 can create and/or modify one or more database entries (e.g., in sensor status database) with information about the sensor(s) that were deployed, the user whose compute resources are being used, the time when the sensor was deployed, the time when the status of the sensor was last updated, and/or any other suitable information about the sensor(s). In some embodiments, process 600 can create and/or modify any suitable number of database entries in any suitable number of databases. For example, process 600 can create and/or modify one database entry for each sensor that is deployed. In some embodiments, each sensor can be configured with identifying information, which can be used to access and/or modify one or more database entries about the sensor. For example, the identifying information can be used as a key in a non-relational database of sensor status information. Note that although database entries are described, this is merely an example, and any type of data structure can be used to monitor deployed sensors, such as a file system. Additionally, in some embodiments, process 600 can update any other suitable information that can be used by a potential attacker to become aware of the existence of sensor 122 (e.g., a DNS entry, a link in a web page, etc.).

At 612, process 600 can receive status information from one or more of the deployed sensors (e.g., as described above in connection with FIG. 1A), and can update one or more database entries for the sensor for which information was received, and/or take one or more actions related to the sensor. For example, a sensor can send status information indicating that a user logged on to the system, the IP address of any user connecting to the system, the credential used to authenticate to the system (or an identifier thereof), that commands were executed by the system, changes made to the sensor, another application, and/or the operating system, such as modification of a registry key, placement of a file, deletion of a file, opening of an additional port, changes to credentials (e.g., username and password that can be used to access the sensor, the virtual machine instance, or another application), etc. As another example, the sensor can send information about the performance of the sensor (e.g., how much memory is being used, how much processing power is being used, how many connections are being made to the sensor, etc.). In some embodiments, status information can be correlated with network activity to distinguish traffic that is potentially associated with a malicious computing device from normal traffic that is unlikely to be malicious. For example, threat intelligence aggregation system 134 can use anomaly detection techniques to distinguish status information that is likely to be correlated with potentially malicious activity, from status information that is unlikely to be correlated with potentially malicious activity. As another example, threat intelligence aggregation system 134 can compare received status information to status changes that are known to be correlated with malicious activity. In a more particular example, threat intelligence aggregation system 134 can compare a registry key change received from the sensor to a set of registry key changes that are known to be associated with malicious activity.

Figure 7:
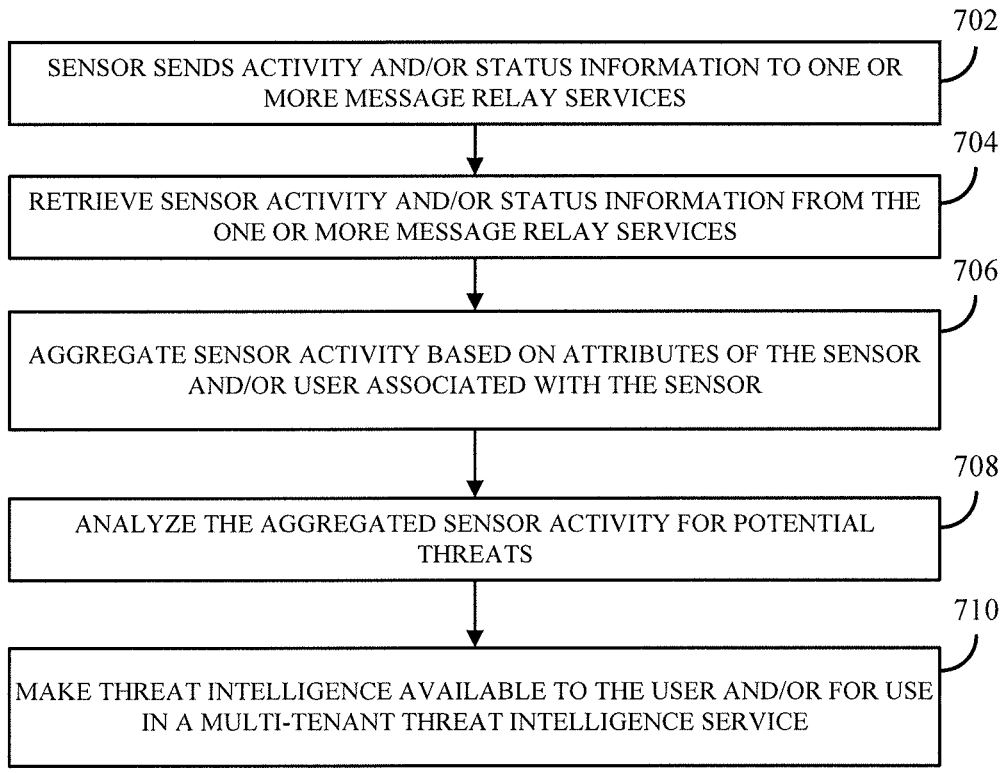
FIG. 7 is a flowchart of an example process for aggregating sensor information and generating threat intelligence information that can be associated with particular groups of users in accordance with some embodiments of the disclosed subject matter.

FIG. 7 shows an example 700 of a process for aggregating sensor information and generating threat intelligence information that can be associated with particular groups of users in accordance with some embodiments of the disclosed subject matter. As shown in FIG. 7, at 702, a sensor can send activity and/or status information to one or more message relay services. In some embodiments, the sensor can send the information at any suitable intervals and/or in response to any suitable event or combination of events. For example, the sensor can include software operable to make web service calls. As another example, the sensor can send activity information and/or status information every hour, every twelve hours, every day, etc. The web service calls that the sensor makes can identify the sensor and include status information. As yet another example, the sensor can send activity information whenever a connection is made to the sensor. As still another example, the sensor can send status information whenever certain changes are made to the sensor, operating system of the device used to implement the sensor, etc.

At 704, process 700 can retrieve sensor activity information and/or sensor status information from the one or more message relay services. In some embodiments, process 700 can request new information from a message relay service, and the message relay service can return the oldest file that was submitted to the message relay service.

At 706, process 700 can aggregate sensor activity information based on attributes of the sensor and/or user associated with the sensor. For example, process 700 can aggregate sensor activity information based on the type of sensor (e.g., web server, database server, mail server, etc.), the industry that the user is in, the geographic region that the user operates in and/or that the sensor was deployed in, the country or countries in which the user operates, etc. In some embodiments, process 700 can remove any potentially identifiable information from the sensor information. For example, by removing the IP address of the sensor, the domain of the sensor, etc. In some embodiments, process 700 can correlate network activity recorded by the sensor with state changes recorded by the sensor prior to aggregating the information.

At 708, process 700 can analyze the aggregate sensor activity to identify potential threats that interacted with the sensors. In some embodiments, process 700 can use any suitable technique or combination of techniques to identify potential threats. For example, process 700 can use anomaly detection techniques to identify potential threats, such as an anomaly detector trained using "normal" data to build a model of normal behavior. In a more particular example, process 700 can submit state change information from the aggregate sensor activity to an anomaly detector trained using presumed normal state change information representing activity of users' production environments (which can be assumed to contain much more non-malicious activity than malicious activity). In such an example, the anomaly detector can return the likelihood that a particular state change from the aggregate sensor activity is malicious based on how it compares with modeled normal behavior. Process 700 can determine that an IP address(es) (or other identifying information) associated with a state change identified as being malicious with at least a threshold likelihood (e.g., 50%, 75%, 99%) by the anomaly detector, process 700 can identify the IP address(es) as being a potential threat. As another example, process 700 can use a trained neural network to identify potentially malicious activity. In a more particular example, process 700 can submit aggregate sensor activity to a neural network that is trained to identify patterns of activity correlated with malicious activity using known malicious activity (e.g., as identified by experts), In such an example, the trained neural network can determine whether any of the submitted activity is likely to be correlated with malicious activity. Process 700 can determine that an IP address(es) (or other identifying information) associated with activity identified as being malicious with at least a threshold likelihood (e.g., 50%, 75%, 99%) by the trained neural network, process 700 can identify the IP address(es) as being a potential threat. As another example, process 700 can identify activity that was consistently correlated with adverse state changes across at least a threshold portion of an industry, geographic region, country, etc. In a more particular example, process 700 can identify adverse state changes in the aggregate sensor activity based on a corpus of state changes known to be correlated with malicious activity. In such an example, when process 700 determines that the aggregate sensor activity includes information identifying a state change that is known to be correlated with malicious activity, process 700 can determine which IP address(es) (or other identifying information) is associated with that activity, and can identify the IP address(es) as being a potential threat.

At 710, process 700 can make threat intelligence identified at 708 available to users that allowed sensors to be deployed using their compute resources. For example, the user can identify a storage location associated with the user (e.g., an electronic data store) that process 700 can use to supply threat information to the user. In some embodiments, process 700 can make the threat intelligence available for use in a multi-tenant threat intelligence service that users, including users that deployed sensors, can use to analyze their network activity for potential malicious activity. Additionally, in some embodiments, process 700 can make the threat intelligence available as a feed to which users (e.g., users that did not allow sensors to be deployed) can subscribe.

In accordance with some embodiments of the disclosed subject matter, a system is provided, the system comprising: one or more hardware computing devices in communication with the first electronic data store and configured to execute specific computer-executable instructions that upon execution cause the system to: receive a request from a first user to deploy a sensor; use information describing virtual machine images used by the first user to configure a first sensor; cause the first sensor to be launched within a virtual network of the first user; receive first activity information sent by the first sensor; combine the first activity information with activity information from a second sensor associated with a second user into third activity information; identify an Internet Protocol ("IP") address as being a suspected source of malicious computing activity using the third activity; create threat information that includes the IP address as a suspected source of malicious computing activity; and make the threat information available to the first user.

In some embodiments, the one or more hardware computing devices are further configured to execute specific computer-executable instructions that upon execution cause the system to: receive information describing a configuration of one or more network connections between at least a first virtual machine in the virtual network corresponding to a first virtual machine image used by the first user and a second virtual machine in the virtual network corresponding to a second virtual machine image used by the first user; use the information describing the virtual machine images used by the first user to configure a second sensor; cause the second sensor to be launched within the virtual network of the first user; cause the first sensor and the second sensor to be connected by one or more network connections in the same configuration of the one or more network connections between the first virtual machine and the second virtual machine.

In some embodiments, the one or more hardware computing devices are further configured to execute specific computer-executable instructions that upon execution cause the system to: configure at least a first port of the first sensor to be unprotected by a firewall associated with the first sensor, wherein the first port of a virtual machine instance implemented in the virtual network is protected by a firewall associated with the virtual machine instance; and configure the firewall associated with the virtual machine instance to inhibit communications from the first sensor.

In some embodiments, the one or more hardware computing devices are further configured to execute specific computer-executable instructions that upon execution cause the system to: cause a user interface to be presented by a computing device associated with the first user that prompts the first user to provide information about a type of industry for which the first user utilizes first compute resources in the virtual network; receive information about the type of industry for which the first user utilizes the first compute resources provided through the user interface; and configure the first sensor using the information about the type of industry for which the first user utilizes the first compute resources.

In accordance with some embodiments of the disclosed subject matter, a system, comprising one or more hardware computing devices configured to execute specific computer-executable instructions that upon execution cause the one or more hardware computing devices to: cause a first sensor to be implemented by first compute resources associated with a first user of a compute resource virtualization platform; receive first activity information sent by the first sensor; aggregate the first activity information and second activity information; identify an Internet Protocol ("IP") address as being a suspected malicious IP address using aggregated activity information; and generate threat information that includes the IP address.

In some embodiments, the first activity information includes first network activity information comprising a plurality of IP addresses that have communicated with the first sensor, and first file system activity comprising one or more files accessed from a first IP address of the plurality of IP addresses.

In some embodiments, execution of the specific computer-executable instructions further causes the one or more hardware computing devices to: transmit a software image corresponding to the first sensor to the first compute resources; and cause the first compute resources to implement the first sensor using the software image.

In some embodiments, execution of the specific computer-executable instructions further causes the one or more hardware computing devices to: cause a user interface to be presented by a computing device associated with the first user that prompts the first user to provide information about a type business in which the first compute resources are being used; and cause the first compute resources to load a file system with a plurality of files, wherein the plurality of files includes types of files based on the type of business provided using the user interface.

In some embodiments, the first sensor is executed by a first virtual machine instance in a subnet isolated from one or more other virtual machine instances of the first user by a security rule inhibiting communications from the first virtual machine instance to the one or more other virtual machine instances.

In some embodiments, execution of the specific computer-implemented instructions further causes the one or more hardware computing devices to: create an entry in a data structure associated with the first sensor, wherein the entry indicates that the first sensor is associated with the first user; receive a message from the first sensor indicating a status of the first sensor; and modify the entry based on the status of the first sensor.

In some embodiments, execution of the specific computer-executable instructions further causes the one or more hardware computing devices to: cause a second sensor to be implemented by second compute resources associated with a service provider of the compute resource virtualization platform; receive third activity information sent by the second sensor; and identify the IP address using the aggregated activity information and the third activity information.

In some embodiments of the disclosed subject matter, a method is provided, the method comprising: aggregating first activity information from a first sensor in a virtual network of a first user account with second activity information from a second sensor in a second network of a second user account; identifying an Internet Protocol ("IP") address as being a suspected malicious IP address using aggregated activity information; and generating threat information that includes the IP address as a suspected source of malicious computing activity.

In some embodiments, the first activity information includes first network activity information comprising a plurality of IP addresses that have communicated with the first sensor, and first file system activity comprising one or more files accessed from a first IP address of the plurality of IP addresses.

In some embodiments, the method further comprises: causing a virtual machine instance in the virtual network to implement the first sensor.

In some embodiments, the method further comprises: causing a user interface to be presented by a computing device associated with the first user that prompts the first user to provide information about a type business in which first compute resources in the virtual network are being used; and causing the first sensor to have access to a file system with a plurality of files, wherein the plurality of files includes types of files based on the type of business provided using the user interface.

In some embodiments, the method further comprises: scanning metadata of a plurality of virtual machine images used by the first user to launch virtual machines instances in the virtual network; selecting a software image corresponding to the first sensor based on similarity of software used to implement the first sensor to software identified in the metadata of a first virtual machine image.

In some embodiments, the method further comprises: receiving network topology information describing how a first virtual machine instance and a second virtual machine instance in the virtual network are connected; causing a second sensor corresponding to the second virtual machine instance to be implemented in the virtual network, wherein the first sensor corresponds to the first virtual machine instance; and causing the first sensor and the second sensor to be connected based on the network topology information.

In some embodiments, the method further comprises: causing a third sensor to be implemented by compute resources associated with a service provider of the virtual network; receiving third activity information sent by the third sensor; and identifying the IP address using the aggregated activity information and the third activity information.

In some embodiments, any suitable computing device or combination of computing devices can execute one or more portions of processes 600, and 700. For example, one or more computing devices associated with sensor provisioning system 112, sensor management system 116, and threat intelligence aggregation system 134 can execute one or more portions of processes 600, and/or 700.

Although subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

It should be understood that the above described steps of the processes of FIGS. 6 and 7 can be executed or performed in any order or sequence not limited to the order and sequence shown and described in the figures. Also, some of the above steps of the processes of FIGS. 6 and 7 can be executed or performed substantially simultaneously where appropriate or in parallel to reduce latency and processing times.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
    one or more hardware computing devices in communication with a first electronic data store and configured to execute specific computer-executable instructions that upon execution cause the system to:
    receive a request from a first user to deploy a sensor;
    use information describing virtual machine images used by the first user to configure a first sensor;
    cause the first sensor to be launched within a virtual network of the first user with a first network connection that facilitates communication between the first sensor and one or more remote endpoints outside of the virtual network;

receive first activity information sent by the first sensor;
combine the first activity information with activity information from a second sensor associated with a second user into third activity information;
identify an Internet Protocol ("IP") address as being a suspected source of malicious computing activity using the third activity;
create threat information that includes the IP address as a suspected source of malicious computing activity; and
make the threat information available to the first user.

2. The system of claim 1, wherein the one or more hardware computing devices are further configured to execute specific computer-executable instructions that upon execution cause the system to:
receive information describing a configuration of one or more network connections between at least a first virtual machine in the virtual network corresponding to a first virtual machine image used by the first user and a second virtual machine in the virtual network corresponding to a second virtual machine image used by the first user;
use the information describing the virtual machine images used by the first user to configure a second sensor;
cause the second sensor to be launched within the virtual network of the first user;
cause the first sensor and the second sensor to be connected by one or more network connections in the same configuration of the one or more network connections between the first virtual machine and the second virtual machine.

3. The system of claim 1, wherein the one or more hardware computing devices are further configured to execute specific computer-executable instructions that upon execution cause the system to:
configure at least a first port of the first sensor to be unprotected by a firewall associated with the first sensor, wherein the first port of a virtual machine instance implemented in the virtual network is protected by a firewall associated with the virtual machine instance; and
configure the firewall associated with the virtual machine instance to inhibit communications from the first sensor.

4. The system of claim 1, wherein the one or more hardware computing devices are further configured to execute specific computer-executable instructions that upon execution cause the system to:
cause a user interface to be presented by a computing device associated with the first user that prompts the first user to provide information about a type of industry for which the first user utilizes first compute resources in the virtual network;
receive information about the type of industry for which the first user utilizes the first compute resources provided through the user interface; and
configure the first sensor using the information about the type of industry for which the first user utilizes the first compute resources.

5. A system, comprising one or more hardware computing devices configured to execute specific computer-executable instructions that upon execution cause the one or more hardware computing devices to:
cause a first sensor to be implemented by first compute resources associated with a first user of a compute resource virtualization platform;
cause the first sensor to be associated with a first network connection that facilitates communication between the first sensor and one or more remote endpoints outside of the first compute resources associated with the first user;
receive first activity information sent by the first sensor;
aggregate the first activity information and second activity information;
identify an Internet Protocol ("IP") address as being a suspected malicious IP address using aggregated activity information; and
generate threat information that includes the IP address.

6. The system of claim 5, wherein the first activity information includes first network activity information comprising a plurality of IP addresses that have communicated with the first sensor, and first file system activity comprising one or more files accessed from a first IP address of the plurality of IP addresses.

7. The system of claim 5, wherein execution of the specific computer-executable instructions further causes the one or more hardware computing devices to:
transmit a software image corresponding to the first sensor to the first compute resources; and
cause the first compute resources to implement the first sensor using the software image.

8. The system of claim 5, wherein execution of the specific computer-executable instructions further causes the one or more hardware computing devices to:
cause a user interface to be presented by a computing device associated with the first user that prompts the first user to provide information about a type business in which the first compute resources are being used; and
cause the first compute resources to load a file system with a plurality of files, wherein the plurality of files includes types of files based on the type of business provided using the user interface.

9. The system of claim 5, wherein the first sensor is executed by a first virtual machine instance in a subnet isolated from one or more other virtual machine instances of the first user by a security rule inhibiting communications from the first virtual machine instance to the one or more other virtual machine instances.

10. The system of claim 5, wherein execution of the specific computer-implemented instructions further causes the one or more hardware computing devices to:
create an entry in a data structure associated with the first sensor, wherein the entry indicates that the first sensor is associated with the first user;
receive a message from the first sensor indicating a status of the first sensor; and
modify the entry based on the status of the first sensor.

11. The system of claim 5, wherein execution of the specific computer-executable instructions further causes the one or more hardware computing devices to:
cause a second sensor to be implemented by second compute resources associated with a service provider of the compute resource virtualization platform;
receive third activity information sent by the second sensor; and
identify the IP address using the aggregated activity information and the third activity information.

12. A method, comprising:
aggregating first activity information from a first sensor in a virtual network of a first user account with second activity information from a second sensor in a second network of a second user account, wherein the first sensor is associated with a first network connection that facilitates communication between the first sensor and one or more remote endpoints outside of the virtual network of the first user account, and the second sensor is associated with a second network connection that facilitates communication between the second sensor and the one or more remote endpoints outside of the virtual network of the second user account;

identifying an Internet Protocol ("IP") address as being a suspected malicious IP address using aggregated activity information; and generating threat information that includes the IP address as a suspected source of malicious computing activity.

13. The method of claim 12, wherein the first activity information includes first network activity information comprising a plurality of IP addresses that have communicated with the first sensor, and first file system activity comprising one or more files accessed from a first IP address of the plurality of IP addresses.

14. The method of claim 12, further comprising: causing a virtual machine instance in the virtual network to implement the first sensor.

15. The method of claim 12, further comprising:

causing a user interface to be presented by a computing device associated with the first user that prompts the first user to provide information about a type business in which first compute resources in the virtual network are being used; and causing the first sensor to have access to a file system with a plurality of files, wherein the plurality of files includes types of files based on the type of business provided using the user interface.

16. The method of claim 12, further comprising:

scanning metadata of a plurality of virtual machine images used by the first user to launch virtual machines instances in the virtual network;

selecting a software image corresponding to the first sensor based on similarity of software used to implement the first sensor to software identified in the metadata of a first virtual machine image.

17. The method of claim 12, further comprising:

receiving network topology information describing how a first virtual machine instance and a second virtual machine instance in the virtual network are connected;

causing a second sensor corresponding to the second virtual machine instance to be implemented in the virtual network, wherein the first sensor corresponds to the first virtual machine instance; and causing the first sensor and the second sensor to be connected based on the network topology information.

18. The method of claim 12, further comprising:

causing a third sensor to be implemented by compute resources associated with a service provider of the virtual network;

receiving third activity information sent by the third sensor; and identifying the IP address using the aggregated activity information and the third activity information.

\* \* \* \* \*